United States Patent
Abe

(10) Patent No.: US 8,577,175 B2
(45) Date of Patent: Nov. 5, 2013

(54) SUBJECT POSITION DETERMINATION METHOD, PROGRAM PRODUCT FOR DETERMINING SUBJECT POSITION, AND CAMERA

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 246 days.

(21) Appl. No.: 12/831,583

(22) Filed: Jul. 7, 2010

(65) Prior Publication Data

US 2011/0007947 A1 Jan. 13, 2011

(30) Foreign Application Priority Data

Jul. 10, 2009 (JP) .................................. 2009-163857

(51) Int. Cl.
*G06K 9/36* (2006.01)
*G06K 9/34* (2006.01)

(52) U.S. Cl.
USPC .......................................... 382/291; 382/164

(58) Field of Classification Search
USPC .......... 382/159, 190, 164, 173; 348/345, 349, 348/350, 208.14, 169, 33.02, 346; 396/89, 396/121, 128
See application file for complete search history.

(56) References Cited

U.S. PATENT DOCUMENTS

| | | | |
|---|---|---|---|
| 7,071,985 B1 * | 7/2006 | Onoda et al. ................... | 348/349 |
| 7,130,465 B2 * | 10/2006 | Muenzenmayer et al. ... | 382/190 |
| 7,450,171 B2 * | 11/2008 | Ide et al. ....................... | 348/345 |
| 7,750,970 B2 * | 7/2010 | Ide et al. ....................... | 348/345 |
| 7,973,853 B2 * | 7/2011 | Ojima et al. ................... | 348/364 |
| 2007/0195191 A1 * | 8/2007 | Ide et al. ....................... | 348/345 |
| 2009/0141937 A1 * | 6/2009 | Abe ............................... | 382/103 |

FOREIGN PATENT DOCUMENTS

| | | | |
|---|---|---|---|
| JP | 2001086328 | * | 3/2001 |
| JP | A-2003-044859 | | 2/2003 |
| JP | A-2004-205885 | | 7/2004 |
| JP | A-2005-318408 | | 11/2005 |
| JP | A-2006-259885 | | 9/2006 |
| JP | A-2008-071014 | | 3/2008 |
| WO | WO 2007/125866 A1 | | 11/2007 |

OTHER PUBLICATIONS

C. Garcia, G. Zikos, G. Tziritas, "Face Detection in Color Images using Wavelet Packet Analysis," icmcs, vol. 1, pp. 9703, 1999 IEEE International Conference on Multimedia Computing and Systems (ICMCS'99)—vol. 1, 1999.*
Nov. 8, 2011 Japanese Office Action issued in Japanese Patent Application No. 2009-163857 (with translation).
Jun. 26, 2012 Office Action issued in Japanese Patent Application No. 2009-163857 (with English Translation).

* cited by examiner

*Primary Examiner* — Andrae S Allison
(74) *Attorney, Agent, or Firm* — Oliff & Berridge, PLC

(57) ABSTRACT

A subject position determination method includes: generating a plurality of binarized images of a target image based upon color information or brightness information of the target image; calculating an evaluation value used to determine a subject position in the target image for each of the plurality of binarized images; and determining a subject position in the target image based upon the evaluation value.

13 Claims, 9 Drawing Sheets

Hue (0~360°)

SUBJECT POSITION DETERMINATION METHOD, PROGRAM PRODUCT FOR DETERMINING SUBJECT POSITION, AND CAMERA

INCORPORATION BY REFERENCE

The disclosure of the following priority application is herein incorporated by reference: Japanese Patent Application No. 2009-163857 filed Jul. 10, 2009.

BACKGROUND OF THE INVENTION

1. Field of the Invention

The present invention relates to a subject position determination method, a program product for determining a subject position, and a camera.

2. Description of Related Art

There is an imaging device known in the related art that performs focusing processing for an AF area selected by the user (Japanese Laid-open Patent Application No. 2004-205885).

SUMMARY OF THE INVENTION

However, it is difficult for the user to accurately position an AF frame to the subject with a traditional imaging device, which may cause a displacement between the AF area selected by the user and the actual subject position, thereby resulting in difficulty in determining the accurate subject position based upon the AF area.

According to the 1st aspect of the present invention, a subject position determination method, comprises: generating a plurality of binarized images of a target image based upon color information or brightness information of the target image; calculating an evaluation value used to determine a subject position in the target image for each of the plurality of binarized images; and determining a subject position in the target image based upon the evaluation value.

According to the 2nd aspect of the present invention, in the subject position determination method according to the 1st aspect, it is preferred that the evaluation value includes a first evaluation value calculated based upon an area of a white pixel region constituted with white pixels in a binarized image and a value indicating a state of concentration of white pixels in the white pixel region and a second evaluation value calculated based upon a distance between the white pixel region and a focus detection region.

According to the 3rd aspect of the present invention, in the subject position determination method according to the 2nd aspect, it is preferred that one or more white pixel regions in the binarized image is specified, the first evaluation value is calculated for each of the specified white pixel regions, a white pixel region in which a greatest first evaluation value is calculated is determined among the specified white pixel regions as a representative region, and the second evaluation value is calculated for the representative region.

According to the 4th aspect of the present invention, in the subject position determination method according to the 2nd aspect, it is preferred that a white pixel region of a predetermined size or greater and a white pixel region of a predetermined size or smaller among one or more white pixel regions in the binarized image are eliminated from a calculation target of the first evaluation value and the second evaluation value.

According to the 5th aspect of the present invention, in the subject position determination method according to the 1st aspect, it is preferred that the generated plurality of binarized images undergo noise removal processing.

According to the 6th aspect of the present invention, in the subject position determination method according to the 1st aspect, it is preferred that: hue is classified into a plurality of divisions; and in each of the plurality of divisions of hue, a binarized image is generated by binarizing pixels corresponding to one of the plurality of divisions of hue and pixels not corresponding to the one of the plurality of divisions in the target image and the plurality of binarized images corresponding to the plurality of divisions of hue are generated.

According to the 7th aspect of the present invention, in the subject position determination method according to the 6th aspect, it is preferred that: a brightness image and a color difference image are generated based upon the color information or the brightness information of the target image; and binarized images are generated for the generated brightness image and the color difference image, and are included in the plurality of binarized images.

According to the 8th aspect of the present invention, in the subject position determination method according to the 7th aspect, it is preferred that based upon an average value and a standard deviation of density values of pixels in each of the brightness image and the color difference image, a density value of each pixel is binarized to generate each of the binarized images for the generated brightness image and the color difference image.

According to the 9th aspect of the present invention, a computer-readable computer program product comprises a program that causes a computer to execute a subject position determination method according to the 1st aspect.

According to the 10th aspect of the present invention, a camera comprises a control unit to execute a subject position determination method according to the 1st aspect.

According to the 11th aspect of the present invention, an image processing device comprises a control unit to execute a subject position determination method according to the 1st aspect.

DESCRIPTION OF PREFERRED EMBODIMENTS

Figure 1:
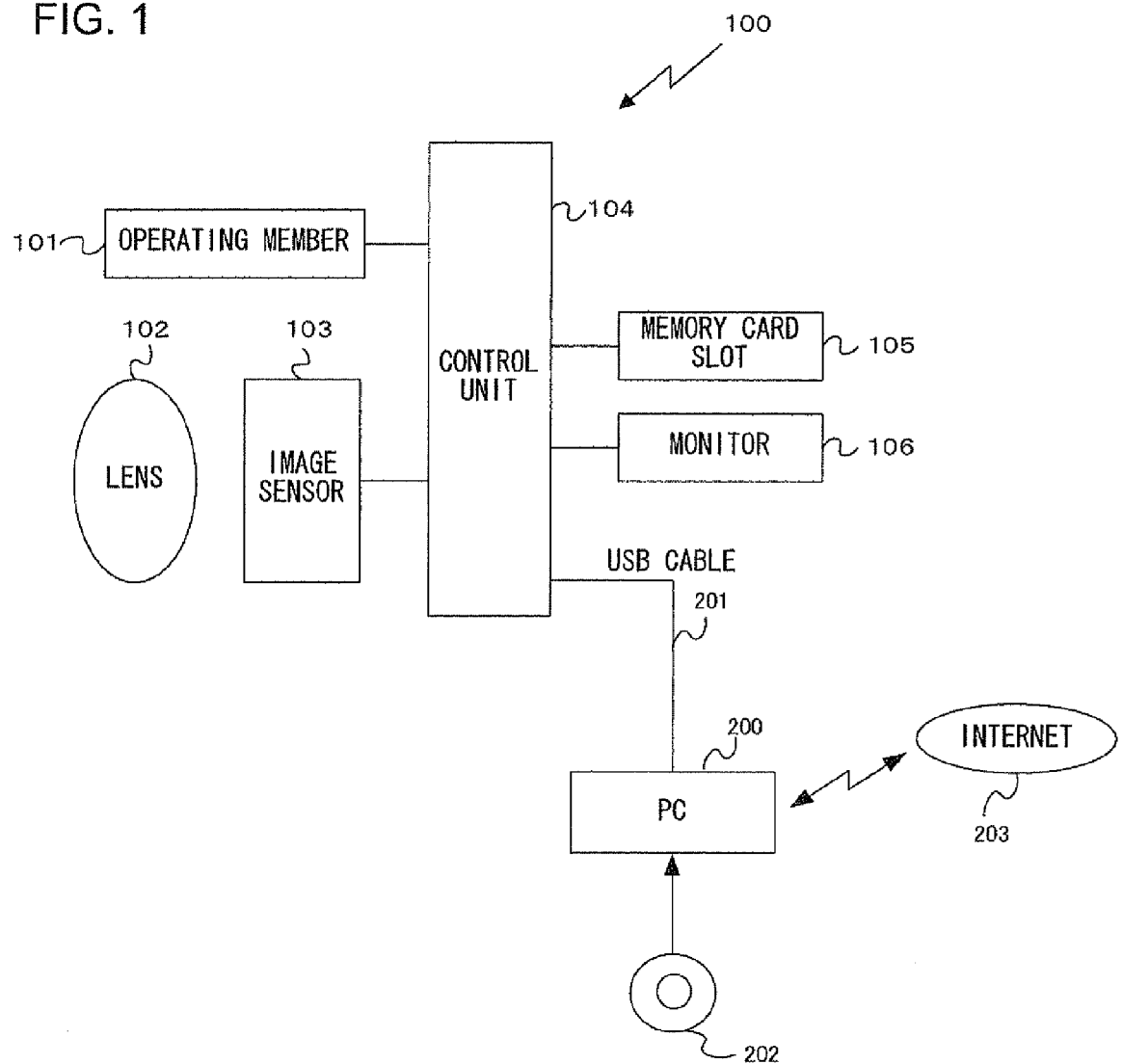
FIG. 1 is a block diagram showing the structure of an embodiment of a camera.

FIG. 1 is a block diagram showing the structure of an embodiment of the camera in the present embodiment. A camera 100 includes an operating member 101, a lens 102, an image sensor 103, a control unit 104, a memory card slot 105, and a monitor 106. The operating member 101 includes a variety of input members to be operated by the user, for instance, a power button, a release button, a zoom button, an arrow key, a decision button, a playback button, a delete button, and the like.

Although the lens 102 is constituted with a plurality of optical lenses, only one lens is illustrated in FIG. 1 as a representative of them. The image sensor 103 is an image sensor, for example, a CCD image sensor, a CMOS image sensor, or the like, which captures a subject image formed by the lens 102. Then, an image signal obtained by the image-capturing is output to the control unit 104.

Based upon an image signal input from the image sensor 103, the control unit 104 generates image data (hereinafter referred to as the main image data) in a predetermined image format, e.g., PEG format. In addition, based upon the generated image data, the control unit 104 generates image data for display, e.g., thumbnail image data. The control unit 104 generates an image file that includes the generated main image data and the thumbnail image data in addition to header information and outputs it to the memory card slot 105. In the present embodiment, both the main image data and the thumbnail image data are image data represented in the RGB color system.

The memory card slot 105 is a slot into which a memory card is inserted as a storage medium, and writes and stores an image file output from the control unit 104 into the memory card. In addition, based upon an instruction from the control unit 104, the memory card slot 105 reads an image file stored in the memory card.

The monitor 106 is a liquid crystal monitor (rear monitor) mounted on the rear surface of the camera 100, on which an image stored in the memory card, a setup menu for setting up the camera 100, and the like are displayed. In addition, when the user sets the mode of the camera 100 into the image-capturing (photography) mode, the control unit 104 outputs image data for display of the images obtained in a time series from the image sensor 103 to the monitor 106. As a result, a live view image (through image) is displayed on the monitor 106.

The control unit 104 is constituted with a CPU, a memory, and other peripheral circuits, and controls the camera 100. It is to be noted that the memory constituting the control unit 104 includes a SDRAM and a flash memory. A SDRAM is a volatile memory, which is used as a work memory for loading a program when the CPU executes the program or used as a buffer memory for temporarily storing data. In addition, the flash memory is a nonvolatile memory, in which a program to be executed by the control unit 104, data of the program, a variety of parameters loaded when the program is executed, and the like are stored.

The program executed by the control unit 104 is stored in a flash memory as described above at the factory shipment of the camera 100. However, as shown in FIG. 1, it may also be arranged that the camera 100 is connected to a personal computer 200 through a USB cable 201 so that the program can be downloaded from the personal computer 200. In this case, the program is provided to the personal computer 200 through a recording medium such as a CD-ROM 202 or, a data signal via an Internet 203 or the like. In addition, it may also be arranged that the program is stored in the memory card so that the program can be downloaded from the memory card through the memory card slot 105.

Since the control unit 104 is constituted with a CPU and the like, the program provided in such a way is a computer-readable computer program product. The program is thus supplied to the camera 100 as a computer-readable computer program product in a variety of forms such as a non-transitory recording medium or a data signal (including a signal through a carrier wave).

Figure 2:
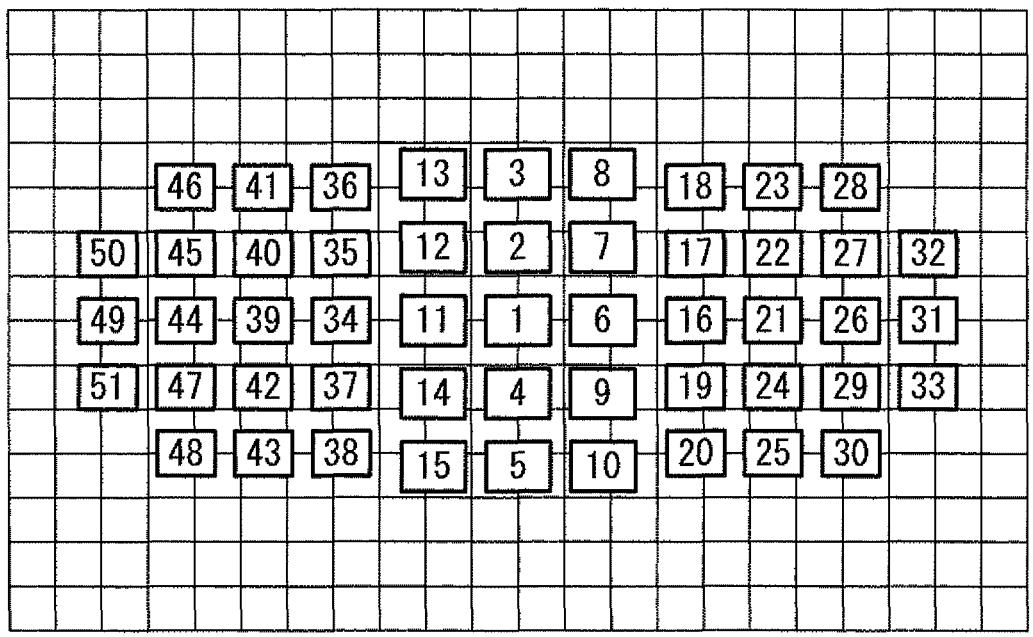
FIG. 2 is a figure schematically showing placement positions of AF sensors on a photographic screen.

In the present embodiment, the control unit 104 determines (finds out and ascertains) the position (location) of a subject in an image based upon the position of an AF area in the image and color information or brightness (luminance) information of the image. It is to be noted that the position of an AF area means the position of an AF area selected for focus detection at the time of photography. For example, in the present embodiment, as shown in FIG. 2, 51 AF areas are two-dimensionally arrayed on a photographic screen according to the placement position of the AF sensor. Then, the control unit 104 displays on the monitor 106 a plurality of AF areas near the subject position in the image. When the user judges and selects the nearest AF area to the subject position from among the AF areas, the control unit 104 performs focusing processing (AF processing) of the known art for the selected AF area so as to perform focusing.

In addition, in the present embodiment, hue is used as information for determining the position of a subject among color information of the image. In order to do this, the control unit 104 first converts each of R, G, and B values into a hue angle using the following equation (1) with respect to each pixel of the target image in which the subject position is to be determined.

[Equation 1]

Hue conversion (1)

$$H = \begin{cases} 60 \times \frac{G-B}{MAX-MIN} + 0, & \text{if } MAX = R \\ 60 \times \frac{B-R}{MAX-MIN} + 120 & \text{if } MAX = G \\ 60 \times \frac{R-G}{MAX-MIN} + 240 & \text{if } MAX = B \end{cases}$$

if $H < 0$ then $H = H + 180$

Figure 3:
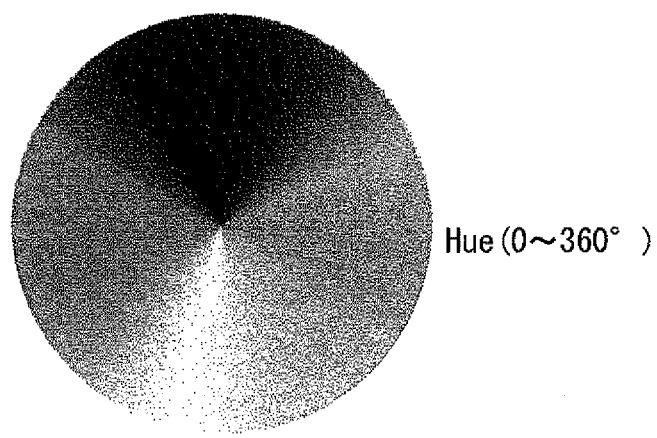
FIG. 3 is a figure showing a hue circle.

It is to be noted that hue is represented by a hue circle shown in FIG. 3 and a hue angle means the angle on the hue circle of the hue value of each pixel.

Figure 4:
FIG. 4 is a figure showing a concrete example of a target image.
Figure 5:
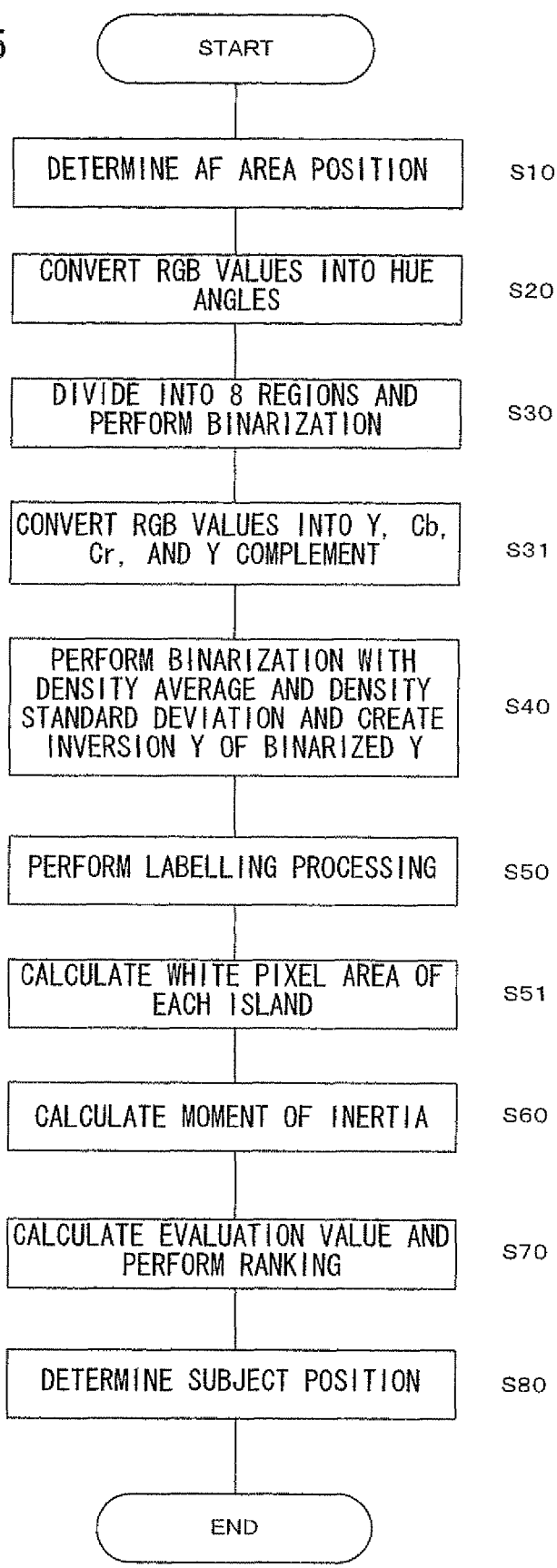
FIG. 5 is a flowchart showing the flow of subject position determination processing.

The processing for determining the subject position with the image shown in FIG. 4 as a target image will now be explained with reference to the flowchart shown in FIG. 5. It is to be noted that the processing shown in FIG. 5 is executed by the control unit 104 as a program that runs when entry of image data from the image sensor 103 starts.

In a step S10, as described above, the control unit 104 determines the AF area position in the target image and the flow of control proceeds to a step S20. In the step S20, as described above, the control unit 104 uses equation (1) so as to convert the R, and B values of the target image into hue angles. After that, the flow of control proceeds to a step S30.

In the step S30, the control unit 104 divides the hue circle shown in FIG. 3 into eight octants (divisions or regions) by an angular width of 45 degrees. As a result, the hue circle is divided into the first octant of 0 degrees≤hue<45 degrees, the second octant of 45 degrees≤hue<90 degrees, the third octant of 90 degrees≤hue<135 degrees, the fourth octant of 135 degrees≤hue<180 degrees, the fifth octant of 180 degrees≤hue<225 degrees, the sixth octant of 225 degrees≤hue<270 degrees, the seventh octant of 270 degrees≤hue<315 degrees, and the eighth octant of 315 degrees≤hue<360 degrees.

Figure 6:
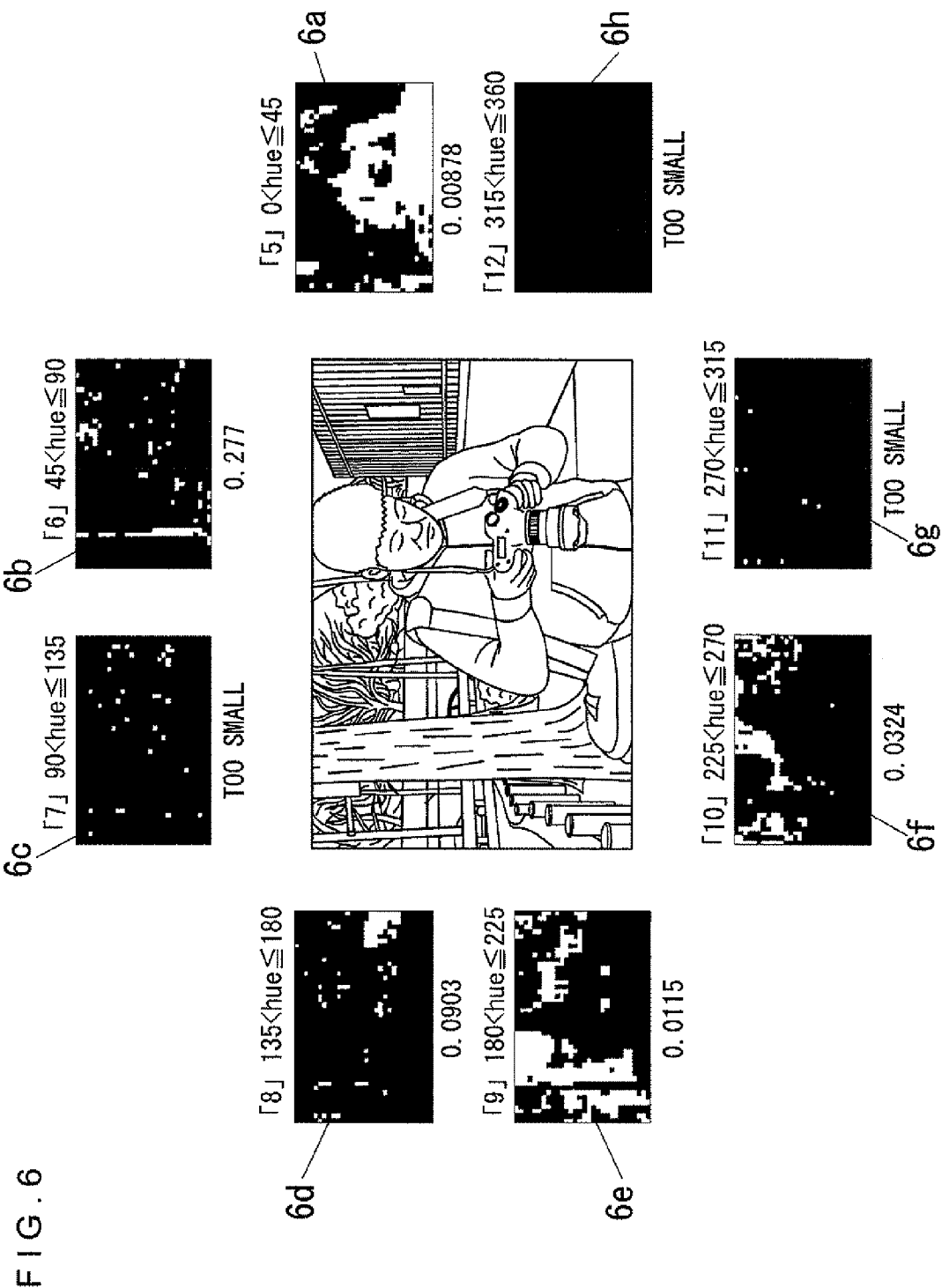
FIG. 6 is a figure showing a concrete example of the target image classified into images in eight octants based upon hue, each of which is binarized.

Then, the control unit 104 binarizes each pixel in the image of each of the octants based upon the hue angle of each of the octants. In other words, among all the pixels in the image of each of the octants, the control unit 104 generates mask images with those pixels whose hue angle falls within the range of hue angle of the octant being white pixels and with the other pixels being black pixels. As a result, as shown in FIG. 6, a mask image 6a of the first octant to a mask image 6h of the eighth octant are generated.

After that, the flow of control proceeds to a step S31 and the control unit 104 performs the following processing. At first, the control unit 104 converts the target image into an image in YCbCr format and generates each of an image of Y component (Y plane image), an image of Cr component (Cr plane image), and an image of Cb component (Cb plane image). In addition, the control unit 104 generates a Y complement image in which white pixels and black pixels in the Y plane image are inverted. More specifically, the control unit 104 uses the following equations (2) to (4) so as to convert the target image represented in RGB color system into a brightness image constituted with brightness components (Y components) and a color difference image constituted with color difference components (Cb components and Cr components) in YCbCr color space.

In other words, for the target image, the control unit 104 uses the following equation (2) so as to generate a brightness (luminance) image constituted with Y components as a Y plane image and uses the following equations (3) and (4) so as to generate a color difference (chrominance) image constituted with Cb components and a color difference (chrominance) image constituted with Cr components as a Cb plane image and a Cr plane image, respectively.

$$Y=0.299R+0.587G+0.114B \quad (2)$$

$$Cb=-0.169R-0.332G+0.500B \quad (3)$$

$$Cr=-0.500R-0.419G-0.081B \quad (4)$$

Figure 7:
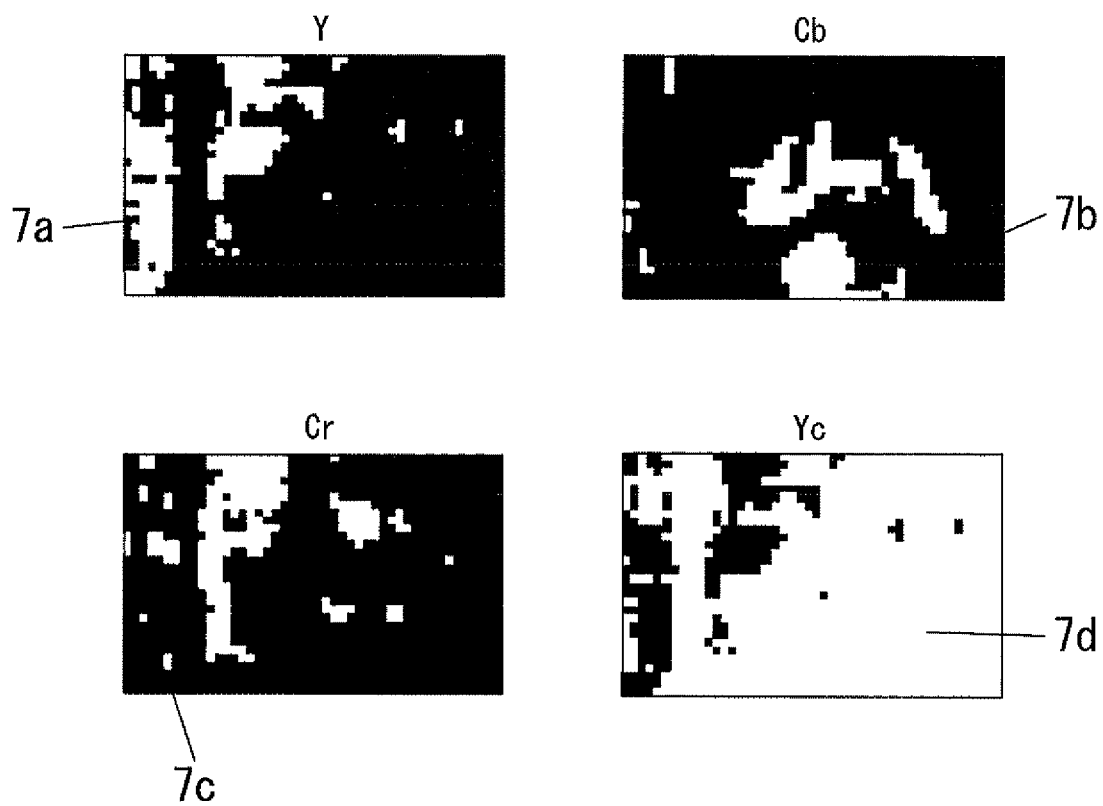
FIG. 7 is a figure showing a concrete example of a binarized Y plane image, a binarized Cb plane image, a binarized Cr plane image, and a binarized Y complement image.

After that, the flow of control proceeds to a step S40 and, for each of the generated Y plane image, Cb plane image, and Cr plane image, the control unit 104 goes through density values of all the pixels in the image and calculates an average of the density values and a standard deviation of the densities. Then, the control unit 104 binarizes the Y plane image, Cb plane image, and Cr plane image using the average of the density values and the standard deviation of the densities each of the plane images. This causes, for instance, as shown in FIG. 7, a binarized Y plane image 7a, a binarized Cb plane image 7b, and a binarized Cr plane image 7c to be obtained. In addition, the control unit 104 inverts 0 and 1 of the binarized Y plane image 7a so as to obtain a complement image (binarized Y complement image) 7d of the binarized Y image.

It is to be noted that in the present embodiment each binarization result has undergone noise filtering using a median filter in FIG. 6 and FIG. 7. In the following explanation, each image obtained by the binarization shown in FIG. 6 and FIG. 7 is referred to as a "binarized image".

Figure 8A:
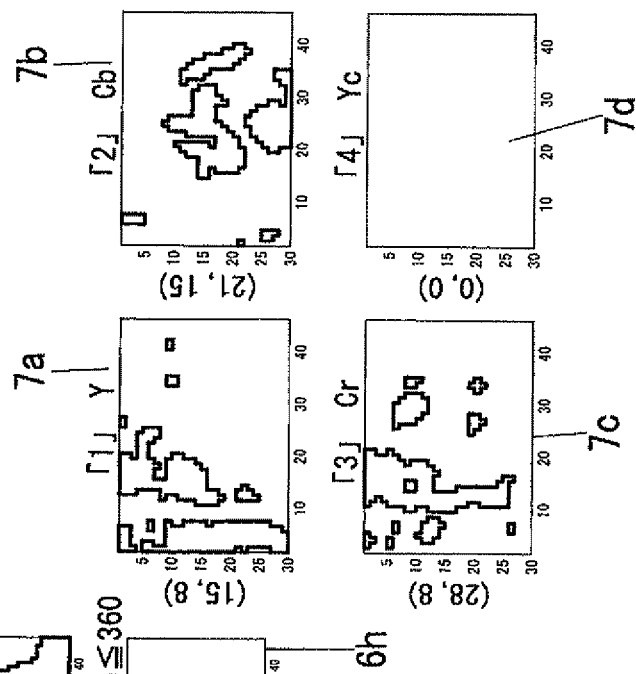
FIG. 8A and FIG. 8B show the results of labeling processing for the binarized images shown in FIG. 6 and FIG. 7.
Figure 8B:
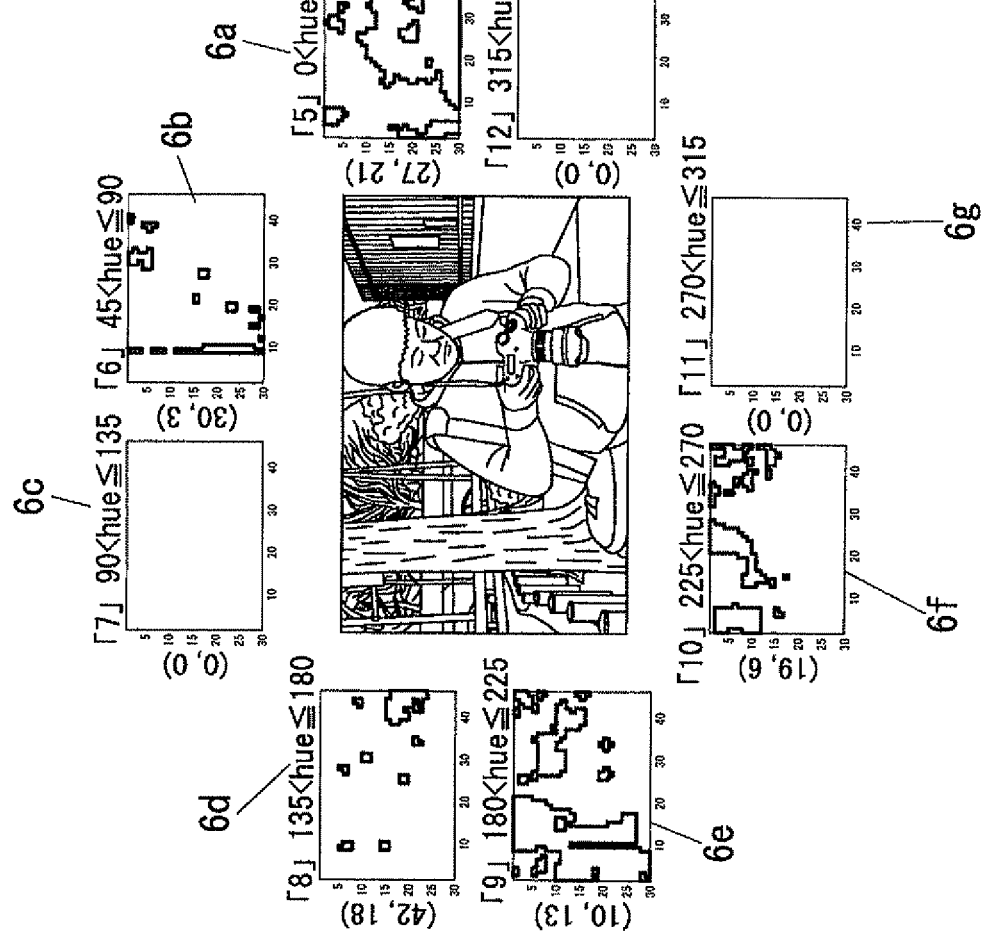

Then, the flow of control proceeds to a step S50 and the control unit 104 performs labeling processing for each of the binarized images shown in FIG. 6 and FIG. 7. More specifically, the control unit 104 performs labeling processing in the following manner. At first, the control unit 104 extracts, as a labeling area, concentration of white pixels in each of the binarized images 6a to 6h shown in FIG. 6 and the binarized images 7a to 7d shown in FIG. 7. Then, the control unit 104 detects, as an island, the labeling area constituted with the extracted white pixels. FIG. 8A and FIG. 8B show the results of labeling processing for the binarized images shown in FIG. 6 and FIG. 7.

After that, the flow of control proceeds to a step S51 and the control unit 104 calculates area of each of the detected islands in each of the binarized images 6a to 6h and 7a to 7d. Then, the flow of control proceeds to a step S60.

In the step S60, from each of the binarized images 6a to 6h and 7a to 7d, the control unit 104 eliminates, among the islands detected in each of the binarized images, islands of a certain size or greater, e.g., those whose area ratio to the whole area of each of the binarized images is 60% or more, and islands of a certain size or smaller, e.g., those whose area ratio to the whole area of each of the binarized images is 1% or less. Then, the control unit 104 calculates the moment of inertia around the centroid (center of gravity) of the white pixels of each of the remaining islands in each of the binarized images.

This processing causes the moment of inertia around the centroid of the white pixels to be calculated for each of the binarized images 6a to 6h and 7a to 7d. It is to be noted that the moment of inertia around the centroid of the white pixels in the binarized images can be calculated, for example, from the sum of the square of the pixel distance from the centroid of the white pixels multiplied by the density value of 0 or 1, although a detailed explanation of the calculation method will be curtailed because it is publicly known.

After that, the flow of control proceeds to a step S70 and, based upon the moment of inertia around the centroid of the white pixels calculated in the step S60, the control unit 104 uses the following equation (5) so as to calculate an evaluation value used to determine the subject position for each island included in each of the binarized images 6a to 6h and 7a to 7d. The evaluation value calculated here is referred to as an evaluation value 1 so as to distinguish from an evaluation value 2 described later.

Evaluation value 1=The number of white pixels constituting an island/The moment of inertia around the centroid of the white pixels (5)

Based upon the evaluation value 1 calculated for each island in each of the binarized images 6a to 6h and 7a to 7d, the control unit 104 determines the island with the greatest evaluation value 1 in each of the binarized images 6a to 6h and 7a to 7d as a representative island and, based upon the evaluation value 1 of the representative island, ranks the binarized images 6a to 6h and 7a to 7d. More specifically, with the evaluation value 1 of the representative island in each of the binarized images as the representative evaluation value 1 of each of the binarized images, the control unit 104 ranks them so that the greater the representative evaluation value 1 is, the higher the rank is. The ranking of the binarized images based upon the representative evaluation value 1 in this case results in, for example, the following order, the binarized image 6b, 7c, 6d, 7b, 6f, 7a, 6e, 6a, 7d, 6c, 6g, and 6h.

It is to be noted that the greater the area of an island is and the smaller the moment of inertia around the centroid of the white pixels of the island is, the greater the evaluation value 1 calculated using the equation (5) becomes. As a result, by performing a ranking in descending order of the evaluation values 1, a binarized image including a greater area of an island, in which white pixels that are highly likely to be the subject concentrate, can be ranked higher.

Next, the control unit 104 calculates, as the evaluation value 2, the distance between the AF area position in the target image determined in the step S10 and the representative island in each of the binarized images and performs the ranking based upon the evaluation value 2. For instance, the control unit 104 calculates the distance between a pixel at the AF area position and a pixel at the centroid position of the representative island and calculates it as the distance between the AF area position and the representative island in each of the binarized images, i.e., the evaluation value 2. Then, the ranking is performed so that the smaller the evaluation value 2 of a binarized image is, i.e., the smaller the distance between the AF area position and the representative island in each of the binarized images is, the higher the binarized image is ranked.

Figures 9A, 9B:
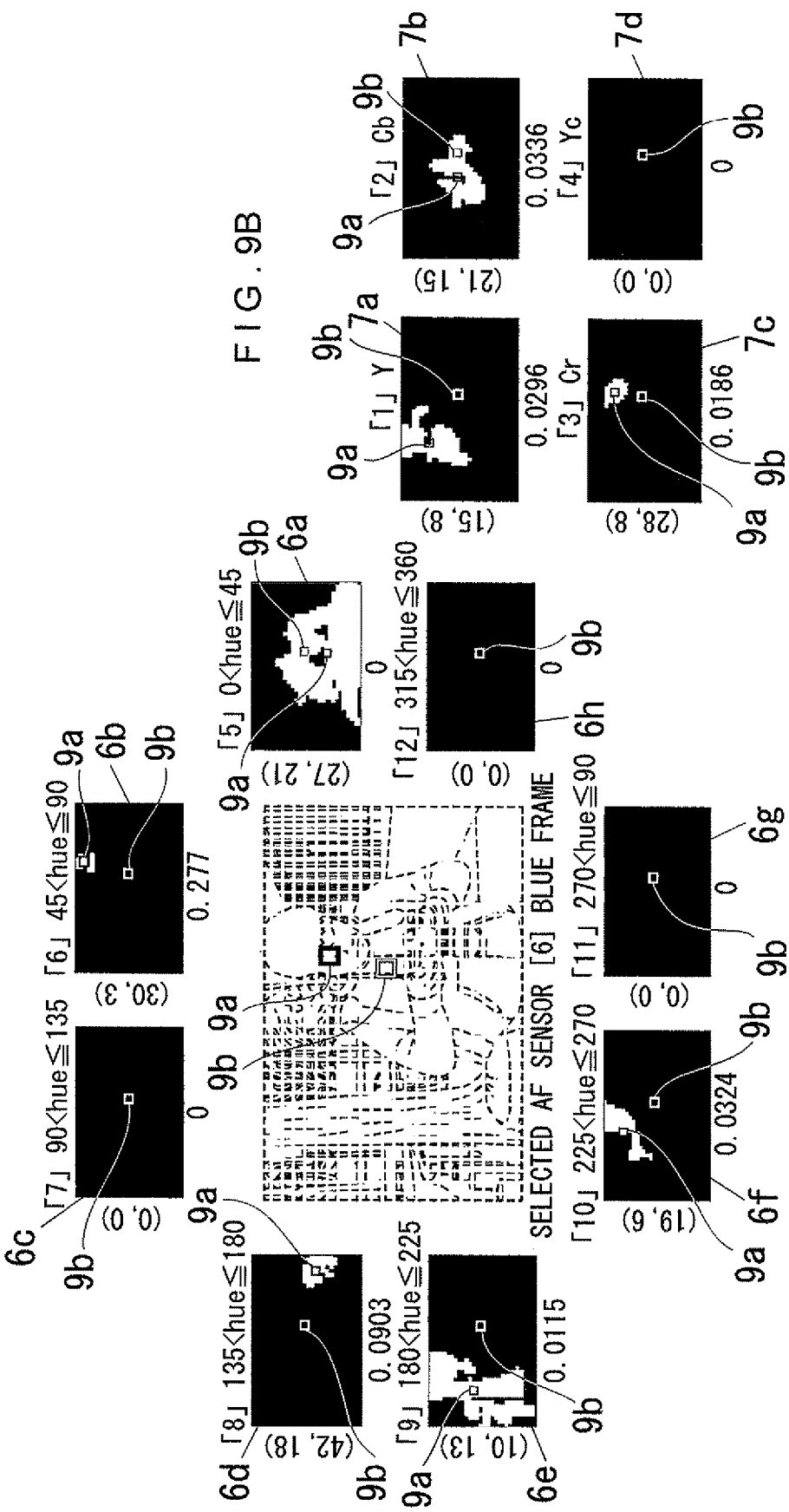
FIG. 9A and FIG. 9B are figures showing a calculation example of a representative evaluation value 1 for each of the binarized images and a concrete example of an AF area position and a centroid of a representative island in each of the binarized images.

In the present embodiment, as shown in FIG. 9A and FIG. 9B for example, an AF area position 9b and a centroid 9a of the representative island are positioned in each of the binarized images. FIG. 9A and FIG. 9B are figures showing a calculation example of a representative evaluation value 1 for each of the binarized images and a concrete example of an AF area position and a centroid of a representative island in each of the binarized images. In FIG. 9A and FIG. 9B, an evaluation value 1 is shown in the lower side of each of the binarized images and coordinates of a centroid of an island is shown in the left side of each of the binarized images. In this case, a ranking result based upon the distance between the AF area position 9b and the centroid 9a of the representative island is, for instance, in order of the binarized image 6a, 7b, 7c, 6f, 6b, 7a, 6d, 6e, 7d, 6c, 6g, and 6h.

It is to be noted that, by performing a ranking so that the smaller the distance between an AF area position and a representative island in a binarized image is, the higher the rank becomes, ranking can be performed in view of the fact that the subject is highly likely to exist near an AF area selected by AF processing.

After that, the flow of control proceeds to a step S80 and the control unit 104 determines the subject position in the target image based upon the result of ranking based upon the evaluation value 1 and the result of ranking based upon the evaluation value 2 performed in the step S70. In the present embodiment, the control unit 104 gives each of the 12 binarized images a score as 12 points for the first place, 11 points for the second place, and one point for the twelfth place based upon the ranking result based upon the evaluation value 1. In addition, the control unit 104 scores them in the same manner also based upon the ranking result based upon the evaluation value 2. Then, the control unit 104 adds the score based upon the evaluation value 1 and that based upon the evaluation value 2 for each of the binarized images and thus calculates the total score of each of the binarized images.

Figure 10:
FIG. 10 is a figure showing a determination result of the subject position of in the target image.

The control unit 104 selects the binarized image with the highest calculated total score and determines the position of the centroid 9a of the representative island in the binarized image as the subject position in the target image. For example, when the total score is calculated based upon the ranking result based upon the evaluation value 1 and the ranking result based upon the evaluation value 2, the total score of the binarized image 7c becomes 21 (11+10), which is the highest, and accordingly the control unit 104 determines the position of the centroid 9a of the representative island in the binarized image 7c as the subject position. As a result, as shown in FIG. 10, a subject position 10a in the target image can be determined. After that, the control unit 104 terminates the processing shown in FIG. 5.

The following operations and advantageous effects can be achieved according to the present embodiment explained above.

(1) The control unit 104 divides a target image into eight octants based upon hue angle and binarizes an image of each of the octants. In addition, the control unit 104 binarizes a brightness (luminance) image and a color difference (chrominance) image, and inverts the binarized brightness images so as to obtain binarized Y complement images. It is arranged that, based upon those binarized images, the control unit 104 calculates an evaluation value used to determine the subject position in a target image and, based upon the evaluation value, determines the subject position in the target image. This allows the control unit 104 to determine the subject position in the target image with a high degree of accuracy.

(2) It is arranged that the control unit 104 calculates the evaluation value 1 using the equation (5) and the evaluation value 2 based upon the distance between a representative island and an AF area. As a result, the subject position can be determined with a high degree of accuracy in view of the area of an island, the degree of concentration of white pixels in the island, and the distance from the AF area to the island.

(3) It is arranged that the control unit 104 determines islands in the binarized images, calculates the evaluation value 1 for each of the specified islands, then determines, as a representative island from among those islands, the island with the greatest evaluation value 1 having been obtained, and calculates the evaluation value 2 for the representative island. As a result, the control unit 104 can determine an island which is highly likely to include the subject in each of the binarized images based upon the evaluation value 1 before narrowing down the island for which the evaluation value 2 is to be calculated, thereby improving the processing speed.

(4) It is arranged that among islands in the binarized images the control unit 104 eliminates islands of a predetermined size or greater and islands of another predetermined size or smaller from the calculation target of the evaluation value. This allows islands less likely to include the subject to be eliminated in advance from the evaluation target, thereby improving the processing speed.

(5) It is arranged that the control unit 104 performs noise filtering for a binarization result using a median filter. This allows the subject position to be determined with a high degree of accuracy without being affected by noise.

—Variations—

It is to be noted that the camera of the embodiment described above may be modified as follows.

(1) In the embodiment described above, an example in which the control unit 104 causes a plurality of AF areas near the subject position in an image to be displayed on the monitor 106 and the user selects one AF area used for AF processing from among those AF areas was explained. However, it may also be arranged that the control unit 104 automatically determines one AF area.

(2) In the embodiment described above, an application of the present invention to a camera was explained. However, the present invention can be applied to another image processing device that can read an image and perform image processing, for instance, a personal computer, a mobile terminal, and the like. Also in this case, similar to the above embodiment, a program is supplied to the personal computer or the mobile terminal as a computer-readable computer program product in a variety of forms.

(3) In the embodiment described above, an example in which the evaluation value 1 is calculated using the equation (5) was explained. However, it may also be arranged that the evaluation value 1 is calculated using the following equation (6).

$$\text{Evaluation value 1} = \text{The number of white pixels constituting an island} / \text{The moment of inertia around an } AF \text{ area position} \quad (6)$$

By performing a ranking using the evaluation value 1 calculated using the equation (6), a relatively large-sized island concentrated around an AF area can be selected using one evaluation value.

It is to be noted that the present invention may be embodied in any way other than those described in reference to the embodiments as long as the functions characterizing the present invention remain intact. In addition, the present invention may assume a structure in which the embodiments described above and the plurality of variations are combined.

What is claimed is:

1. A subject position determination method for determining a subject position in a target image, comprising:
    generating a plurality of binarized images from target image data based upon color information or brightness information of the target image;
    calculating an evaluation value used to determine the subject position in the target image for each of the plurality of binarized images, the evaluation value including a first evaluation value calculated based upon an area of a white pixel region constituted with white pixels in a binarized image and a value indicating a state of concentration of white pixels in the white pixel region, and a second evaluation value calculated based upon a distance between the white pixel region and a focus detection region; and
    determining the subject position in the target image based upon the evaluation value.

2. A subject position determination method according to claim 1, wherein
    one or more white pixel regions in the binarized image is specified, the first evaluation value is calculated for each of the specified white pixel regions, a white pixel region in which a greatest first evaluation value is calculated is determined among the specified white pixel regions as a representative region, and the second evaluation value is calculated for the representative region.

3. A subject position determination method according to claim 1, wherein
    a white pixel region of a predetermined size or greater and a white pixel region of a predetermined size or smaller among one or more white pixel regions in the binarized image are eliminated from a calculation target of the first evaluation value and the second evaluation value.

4. A subject position determination method according to claim 1, wherein
    the generated plurality of binarized images undergo noise removal processing.

5. A non-transitory computer-readable computer program product, comprising:
    a computer program that causes a computer to execute a subject position determination method according to claim 1.

6. A camera, comprising:
    a control unit to execute a subject position determination method according to claim 1.

7. An image processing device, comprising:
    a control unit to execute a subject position determination method according to claim 1.

8. A subject position determination method for determining a subject position in a target image, comprising:
    generating a plurality of binarized images from target image data based upon color information or brightness information of the target image;
    calculating an evaluation value used to determine the subject position in the target image for each of the plurality of binarized images; and
    determining the subject position in the target image based upon the evaluation value, wherein
    hue is classified into a plurality of divisions, and
    in each of the plurality of divisions of hue, a binarized image is generated by binarizing pixels corresponding to one of the plurality of divisions of hue and pixels not corresponding to the one of the plurality of divisions in the target image and the plurality of binarized images corresponding to the plurality of divisions of hue are generated.

9. A subject position determination method according to claim 8, wherein
    a brightness image and a color difference image are generated based upon the color information or the brightness information of the target image; and
    binarized images are generated for the generated brightness image and the color difference image, and are included in the plurality of binarized images.

10. A subject position determination method according to claim 9, wherein
    based upon an average value and a standard deviation of density values of pixels in each of the brightness image and the color difference image, a density value of each pixel is binarized to generate each of the binarized images for the generated brightness image and the color difference image.

11. A non-transitory computer-readable computer program product, comprising:
    a computer program that causes a computer to execute a subject position determination method according to claim 8.

12. A camera, comprising:
    a control unit to execute a subject position determination method according to claim 8.

13. An image processing device, comprising:
    a control unit to execute a subject position determination method according to claim 8.

* * * * *